United States Patent [19]

Perrin

[11] Patent Number: 5,373,530
[45] Date of Patent: Dec. 13, 1994

[54] MELTING FURNACE WITH GAS INJECTION

[75] Inventor: Nicolas Perrin, Louveciennes, France

[73] Assignee: L'Air Liquide, Societe Anonyme pour L'Etude Et L'Exploitation des Procedes Georges Claude, Paris, France

[21] Appl. No.: 242,453
[22] Filed: May 13, 1994

[30] Foreign Application Priority Data

Jun. 2, 1993 [FR] France ................. 93 06562

[51] Int. Cl.$^5$ .............................. F27D 23/04
[52] U.S. Cl. ........................ 373/85; 373/2; 373/80; 266/189
[58] Field of Search ............... 373/2, 85, 116, 80, 373/72; 266/156, 159, 186, 189; 432/95; 110/214

[56] References Cited

U.S. PATENT DOCUMENTS

| | | | |
|---|---|---|---|
| 2,781,190 | 2/1957 | Weir | 266/189 |
| 3,459,867 | 8/1969 | Estes | 373/2 |
| 4,171,798 | 10/1979 | Vietorisz | 266/47 |
| 5,166,950 | 11/1992 | Jouvaud et al. | 373/2 |

FOREIGN PATENT DOCUMENTS 0257450 3/1988 European Pat. Off. .
0462898 12/1991 European Pat. Off. .
2372231 6/1978 France .

Primary Examiner—Bruce A. Reynolds
Assistant Examiner—Tu Hoang
Attorney, Agent, or Firm—Young & Thompson

[57] ABSTRACT

A furnace comprises a space overlying a charge into which space opens at least one oxygenated gas injector passing through the periphery of the furnace to deliver within this space a jet of gas that is nonradial relative to a vertical axis of the space. Each injector comprises a) a head (14) disposed within the thickness of the wall (1) of the furnace and having a gas passage having an axis (11) inclined at a predetermined angle ($\alpha$) to an axis (15) that is substantially radial relative to the vertical axis of the space overlying the charge and b) a substantially cylindrical body (16) prolonging the head and the gas passage within the furnace along this substantially radial axis (15), itself substantially perpendicular to the wall (1) through which it passes. The injector is useful in an electric furnace for melting scrap for the production of steel.

10 Claims, 1 Drawing Sheet

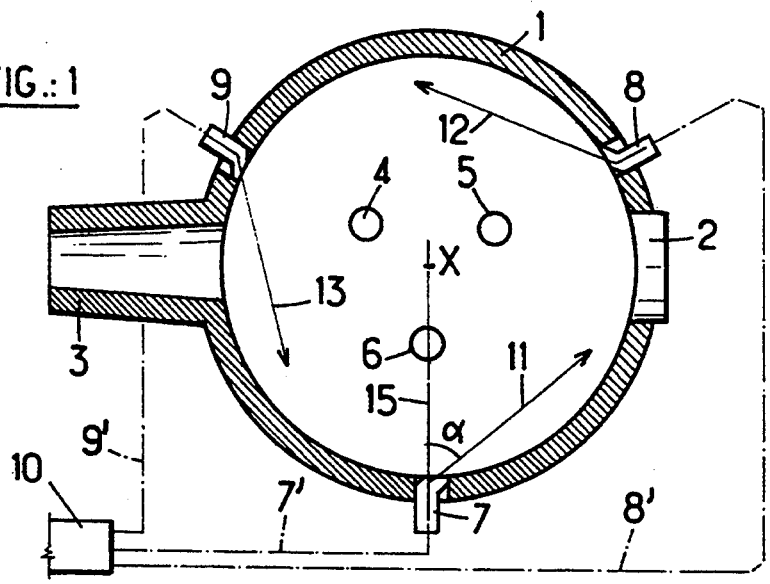
FIG.: 1
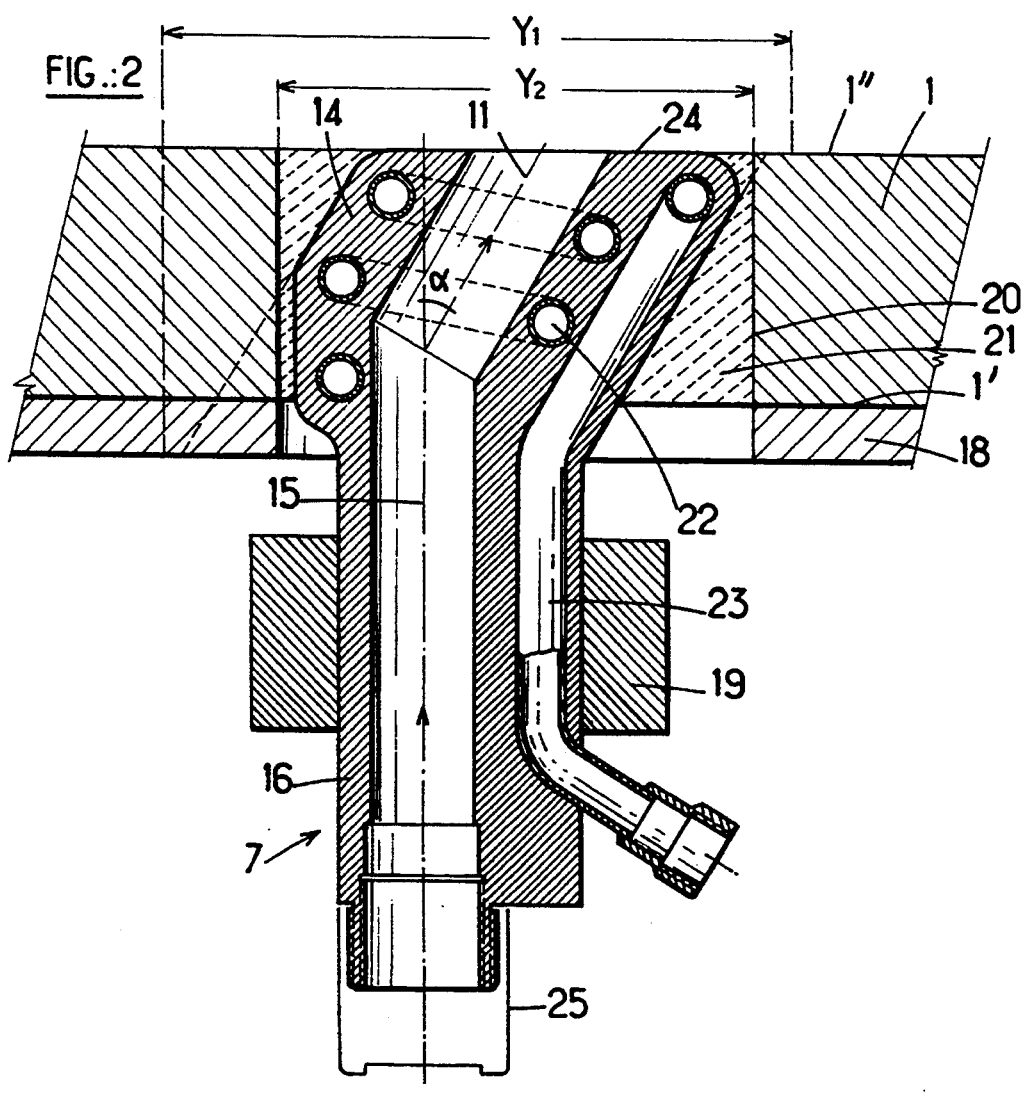
FIG.: 2

MELTING FURNACE WITH GAS INJECTION

BACKGROUND OF THE INVENTION

The present invention relates to a furnace for melting a charge and, more particularly, to such a furnace comprising a space overlying a charge into which opens at least one oxygenated gas injector passing through the circumference of the furnace to deliver into this space a gas jet which is nonradial relative to the central vertical axis of the furnace. The present invention also relates to a gas injector designed for such a furnace.

There is known from U.S. Pat. No. 5,166,950, in the name of the applicant and hereinafter called "the mentioned patent", a process and installation for melting a charge in a furnace, particularly an electric furnace for the melting of scrap for the production of steel, by bringing fusion energy to the charge and with post-combustion of the fumes by injection of an oxygenated gas into a space in the furnace located above the charge.

In FIGS. 1 and 2 of the mentioned patent, there is shown a furnace with a substantially circular side wall traversed obliquely by two sets of straight oxygenated gas injectors, these injectors being oriented in substantially horizontal directions nonradially relative to the vertical axis of the furnace, so as to create rotating gas currents turning in opposite directions in the space within the furnace located above the charge. There is thus ensured an efficacious mixture of the oxygenated gas with combustible gases ($CO$, $H_2$) emitted by the charge so as to give rise to a homogenous post-combustion of these gases in the furnace, which contributes to melting of this charge, in cooperation with vertical electrodes distributed about and in the vicinity of the vertical axis of the furnace.

It is obviously necessary to provide, in the side wall of the furnace, passages for the injectors. With straight injectors passing obliquely through this wall, as shown in the mentioned document, it will be understood that the passages to be provided must be relatively wide, so that they will permit necessary adjustments of the position of the axis of the injector in all directions in the space, this position being adapted to vary from one type of furnace to another. The presence of wide passages in the side wall of the furnace obviously constitutes a drawback, worsened when the number of injectors is increased to improve the agitation of the gases used in post-combustion.

The injectors of the furnace of the mentioned patent protrude substantially within the periphery of the furnace. If this latter is supplied vertically by the scrap iron to be melted, pieces of scrap iron can thus damage the ends of the injectors by striking these when they fall. These protuberant ends are also threatened by blockages due to the projection of slag or metal from the melting mass.

SUMMARY OF THE INVENTION

The present invention therefore has for its object to provide a melting furnace which does not have these drawbacks and which in particular has passages for the oxygenated gas injectors, whose surface is the smallest possible while permitting nonradial injection of this gas.

The present invention also has for its object to provide such a furnace in which the gas injectors are designed so as to be well protected both from falling scrap iron and from projections of slag or melting metal.

The present invention also has for its object to provide such a furnace of increased lifetime, by reduction of the risks of the oxidation of the electrodes or of piercing the wall of the furnace under the action of gas jets leaving the injectors. The present invention also has for its object to increase the lifetime of the injectors themselves and of the antireturn valves disposed downstream of the gas channel supplying the injectors.

These objects of the invention are achieved with a an oxygenated gas injector for a furnace for melting a charge, characterized in that it comprises an assembly of an elongated body having a principal direction and defining a gas supply passage, and a head defining a gas outlet passage inclined at a predetermined angle relative to the predetermined angle, the head being dimensioned to be received in a window in a wall of the furnace.

Thanks to this arrangement, the lateral size of the injector at the level of the wall of the circumference of the furnace is reduced relative to that of a "straight" injector and therefore the corresponding dimensions of the passage to be provided through this wall for receipt of the injector are decreased.

According to another characteristic of the furnace according to the invention, this latter comprises support means in engagement with the body of the injector, permitting a rotation of the injector about the axis of its body. The orientation of the gas jet leaving the injector can thus be easily adjusted to adapt it for example to one or another type of furnace.

Other characteristics and advantages of the present invention will become apparent from a reading of the description which follows and a study of the accompanying drawing, in which:

BRIEF DESCRIPTION OF THE DRAWING

FIG. 1 is a schematic view, in transverse cross section, of the furnace according to the invention, and FIG. 2 is an axial cross sectional view of an oxygenated gas injector designed for the furnace of FIG. 1.

DESCRIPTION OF THE PREFERRED EMBODIMENTS

The furnace shown in this figure is of the type described in the mentioned patent to which reference can be had for more details concerning its general arrangements.

Thus this furnace comprises, in the illustrated embodiment, between a hearth and a roof, a cylindrical side wail 1 forming a portion of the periphery of the furnace and provided with a so-called clean out door 2 and a teeming spout 3 for melted products, three electrodes 4, 5, 6 regularly spaced about the vertical axis X of the furnace.

The furnace comprises a plurality of gas injectors which can, as in the mentioned patent, be spaced in several staged series within the furnace. For clarity of FIG. 1, there is shown but a single series of such injectors 7, 8, 9 supplied with gas by channels 7', 8', 9' respectively, connected to a source 10 of oxygenated gas or oxygen. As in the mentioned patent, the injectors 7, 8, 9 blow the oxygenated gas into the furnace in the directions 11, 12, 13 respectively, which are not radial, but so-called "tangential", establishing a circulation of gas in the counterclockwise direction, as seen in FIG. 1. Adjacent series of injectors disposed above or below that shown in FIG. 1 establish as the case may be circulations of gas in the opposite direction, according to the teachings of the mentioned patent.

Referring now to FIG. 2 of the accompanying drawing, it will be seen that any one of the injectors 7, 8, 9, for example injector 7, comprises a head 14 disposed within the thickness of the wall 1 of the furnace and having a substantially cylindrical gas passage with an axis 11 inclined at an angle α to an axis 15 that is radial relative to the vertical axis X of the furnace as shown in FIG. 1.

The head 14 is formed at the end of a generally cylindrical body 16 whose axis coincides with axis 15 when the injector is mounted on the furnace, this body being hollow and having a gas passage prolonging that of the axis 11 which passes through the head, the body thus extending beyond the external surface 1' of the wall 1 of the furnace, which wall is conventionally supported by a support structure 18 schematically shown in FIG. 2.

Again according to the invention, the body 16 of the injector is mounted for rotation about the axis 15 within a support bearing 19, also schematically shown in this figure.

A nonreturn valve 25, schematically shown in FIG. 2, is mounted within the injector downstream of a supply channel for oxygenated gas. It is adapted to stop any possible projections of slag or metal to avoid any risk of combustion in the channel.

In this figure it will be seen that the wall 1 of the furnace is pierced by a passage or window 20 so dimensioned as to receive the head 14 of the injector. Once this head is positioned in this window, and its position precisely adjusted, the space 21 remaining free between the furnace wall and the head 14 is filled with a suitable refractory material, or by a member cooled by water, for example, to close the furnace at the injector.

In FIG. 2 there is shown at $Y_1$ and $Y_2$, respectively, the lateral dimensions of a "straight" gas injector disposed obliquely through the wall 1 of the furnace and an injector according to the invention. It will be clearly seen that the dimension $Y_2$ of the injector according to the invention is substantially less than that ($Y_1$) of the conventional straight injector, according to one of the objects that is sought.

Although the axes 11 and 15 will normally be contained in a substantially horizontal plane, it is generally necessary to adjust the position of the axis 11 as a function of the peculiarities of the furnace. This latter could take account, for example, of the position of the electrodes 4, 5 and 6 which can vary from one type of furnace to another. The oxygenated gas jets leaving the injectors must be sufficiently spaced from the electrodes so as not to risk oxidizing these latter. The same is true with respect to the surface of the melting charge and to the internal surface of the side wall of the furnace.

According to the invention, there is simply regulated, before emplacing the refractory material in the space 21, the position of the axis 11 of the jet of oxygenated gas, by a rotation of the injector through a suitable angle, about the axis 15. The support bearing 19 for the injector guides this rotation.

According to another characteristic of the invention, the resistance of the injector to high temperature prevailing in the furnace is ensured by arranging refrigeration means within the head of the injector. These means are supplied by a source (not shown) of a refrigerant such as cold water and comprise for example a coil 22 connected to this source by a supply conduit 23. The coil 22 and the conduit can be made of copper tubing, for example, suitably shaped. After forming, the tube is placed in a mold shaped like the external surface of the injector, into which mold is then poured melted copper which bonds to the tube to ensure perfect heat exchange between the cooling fluid and the injector. As a modification, the injector could have the shape of a double envelope traversed by a flow of cooling water.

According to another characteristic of the invention apparent from FIG. 2, the head of the injector has an end surface 24 inclined in an angle ($\pi/2-\alpha$) to the axis 11 of the head so as to be inscribed within the internal surface 1'' of the wall 1. This arrangement permits supplying the furnace vertically by gravity, along its axis X, without risk of damaging the injectors. Thus the pieces of scrap which fall within the furnace cannot damage the injector heads, entirely retracted within the furnace wall. Thanks to this arrangement, the lifetime of the injectors is further increased.

Preferably, the surface of the gas passage of the injector is polished to limit the retention and accumulation of spattered slag and metal, and to promote their removal by blowing oxygenated gas. The end surface 24 of the injector can also be covered with a refractory material of ceramic type, suitable to protect the injector from internal radiation of the furnace.

Again preferably, according to the invention, injectors of oxygenated gas are provided having a large gas passage, for example of the order of 4 to 6 centimeters in diameter, which ensures equal flow rate, and at a speed lower than or equal to that of sound, thereby to effect an agitation of the gas within the furnace which is more effective than with a cross section of smaller surface.

Again preferably, according to the invention, the angle α is chosen such that:
$$20° < \alpha < 60°$$

a value of α of the order of 30° to 40° being preferred. There is thus avoided not only the oxidation of the electrodes but also the perforation of the walls of the furnace by jets that are too "tangential".

Moreover, the elbowed configuration of the injector according to the invention permits limiting the risk of plugging by projections of slag or melted metal and damaging the antireturn valve.

A furnace embodying the present invention has been constructed. Thanks to the invention, it has been possible to obtain a great decrease of the melting time for the charge as well as a decrease of consumption of the necessary electric energy, in combination with an increase of the lifetime of the injectors (greater than three months) and an absence of localized overheating of the panels comprising the walls of the furnace. In no less advantageous a way, the surface of the windows to be provided in the wall of the furnace for the passage of the injectors is diminished by 25 to 50 percent relative to that necessary for the passage of straight injectors.

Of course the invention is not limited to the embodiment described and shown which has been given only by way of example. Thus the teachings of the present invention could be practiced in an injector constituted by separate members, bodies, head, coil etc. . . and assembled by any conventional means other than casting in a mold, although this later technique is preferred.

What is claimed is:

1. Oxygenated gas injector for a furnace for melting a charge, comprising an elongated body (16) having a principal direction and defining a gas supply passage, and a head (14) defining a gas outlet passage (11) inclined at a predetermined angle (α) relative to the principal direction, the head being dimensioned to be received in a window (20) in a wall (1) of the furnace.

2. Injector according to claim 1, wherein the head has an end surface (24) substantially orthogonal to the principal direction.

3. Injector according to claim 1, further comprising means (19) for rotationally supporting said body (16).

4. Injector according to claim 1, further comprising cooling means (22, 23) for said head (14).

5. Injector according to claim 1, wherein said angle ($\alpha$) is between 20° and 60°.

6. Injector according to claim 1, wherein the head (14) and the body (16) are of a single piece of metal.

7. A furnace for melting a charge, having a side wall (1), comprising at least one injector (7, 8, 9) according claim 1, whose head (14) is mounted in the wall (1) with the outlet passage (11) opening in a substantially tangential direction within the furnace.

8. Furnace according to claim 7, wherein body (16) of the injector extends substantially radially of the furnace.

9. Furnace according to claim 7, wherein the end surface (24) of the head (14) is substantially coplanar with the internal surface (1″) of said wall (1).

10. Furnace according to claim 7, wherein the head (14) is sealed in position in the wall (1) of the furnace.

* * * * *